United States Patent Office 3,208,865
Patented Sept. 28, 1965

3,208,865
STABILIZED NITROCELLULOSE COMPOSITIONS
Frank Joseph Arthen, Franklin Township, Somerset County, Ralph Arthur Coleman, Middlesex, and William Baptist Hardy, Bound Brook, N.J., assignors to American Cyanamid Company, Stamford, Conn., a corporation of Maine
No Drawing. Filed Apr. 11, 1963, Ser. No. 272,240
1 Claim. (Cl. 106—187)

This application is a continuation-in-part of application Serial No. 116,953, filed June 14, 1961, now abandoned.

This invention relates to new compositions of matter, and, more specifically, it relates to a nitrocellulose lacquer composition stabilized with a minor amount of a compound of the Structure I:

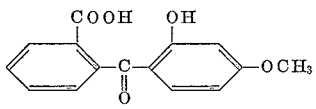

(I)

The protection of various resins and plastics against the degradative effects of ultraviolet light, by inclusion in the composition of an ultraviolet absorbing compound has become a standard practice. To be useful in a given substrate, certain requirements have to be met by the ultraviolet absorber. Thus, the compounds must have suitable solubility characteristics, etc., which make it compatible with the composition in which it is incorporated. It must have strong absorption in the ultraviolet range. It should have low volatility so that it is not lost from the composition by evaporation. It should be stable to ultraviolet light and not be easily decomposed thereby. It should be easily incorporated into the polymeric composition or be easy to apply to the composition after it is formed; and it should impart little or no color of its own to the composition. While many of these requirements have been met by various compounds, there is still a need for ultraviolet absorbers which satisfy all these requirements.

It has been found that the compound of Formula I is an excellent ultraviolet absorber for the protection of nitrocellulose coating materials.

It is most surprising that this carboxybenzophenone gives such excellent results and is compatible with the nitrocellulosic compositions and causes no yellowing effect. For example, it was heretofore believed that the presence of acidic groups (like the carboxy group) would impact undesirable solubility and acidic characteristics to the product, since the product would presumably be more hydrophilic and water soluble and therefore less soluble in the plastic composition. In addition, this compound should be more sensitive to pH change than are the much less acidic phenolic compounds of the benzophenone series heretofore used as ultraviolet absorbers. But, on the contrary, it is not.

It is an advantage of this invention that the compound of Formula I gives no yellowing either with increase in pH or upon being incorporated in the lacquer formulation. It is a further advantage of this invention that the compound of Formula I has superior solubility in the resinous composition, superior properties as an ultraviolet absorber with respect to light stability, absorption maximum, degree of absorptivity at the wave length of maximum absorption, low volatility, little or no change in color with change of pH and ease of application by simple procedures.

The absorption characteristics of the compound of this invention do not change markedly in aqueous solution over a wide range of pH as shown by the following table in which the absorptivity of the compound of Formula I is measured at varying pH's.

| pH | Max, mu | a Max |
|------|---------|-------|
| 2.1  | 315     | 35.7  |
| 7.0  | 315     | 35.0  |
| 12.1 | 315     | 29.2  |

At a pH of 12.1 the compound shows very little color, having an [a] 400 of 6.1, whereas even at a pH of 9.8, the standard U.V. absorber, 2-hydroxy-4-methoxybenzophenone, shows more color (having an [a] 400 of 21.5).

In preparing the compositions of this invention, the ultraviolet absorber may be incorporated into the nitrocellulose substrate by the usual methods (e.g., milling or mixing or adding the absorber to the lacquer formulation). Of course, standard additives, modifiers and extenders may be present in the nitrocellulose material without interfering with the protection afforded by the absorber of this invention. The amount of ultraviolet absorber which may be employed depends on the desired degree of protection. As little as 0.05% by weight of the polymeric material will be effective under mild conditions whereas as much as 10% by weight of the polymer may be required for other uses. For most applications, the use of from about 0.25% to about 5.0% is sufficient.

*Example 1*

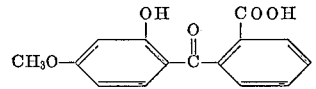

24.8 parts of metamethoxyphenol dissolved in 300 parts of nitrobenzene and 53.2 parts of aluminum chloride is added in small portions. The mixture is stirred while 29.6 parts of phthalic anhydride is added in small portions. Hydrogen chloride is evolved and the mixture becomes very warm. The mixture is stirred for a period and after the exothermic reaction has subsided, is heated on a steam bath where it soon becomes too thick to stir. The mixture is then allowed to stand until cooled. Fifty cc. of ice cold concentrated hydrochloric acid is then added, and the mixture is steam stripped, salt is added to the residual liquor and the water is decanted off. The remaining dark gum is dissolved in sodium carbonate solution and decolorized with activated charcoal by heating and filtering. The filtrate is acidified giving a brown gum which is recrystallized successfully from methanol and acetonitrile.

*Example 2*

2'-carboxy-2-hydroxy-4-methoxybenzophenone is incorporated into a standard nitrocellulose lacquer formulation in various concentrations. Films 1.6 to 2.5 mils thick are drawn onto one side of microscopic slides and exposed in a Fade-Ometer. The following table lists the yellowing and Fade-Ometer hours when cracking of the films occurred.

| Conc. (percent) | Degree of yellowing, Fade-Ometer (hours) | | Hours when cracking occurred |
|---|---|---|---|
| | 0 | 300 | |
| 0 | 0.2 | 3.8 | 300–400 hours. |
| 5.0 | 0.2 | 4.4 | None at 500 hours. |
| 10.0 | 0.3 | 4.7 | None at 500 hours. |

Example 3

Pine wood is coated with nitrocellulose lacquer containing varying concentrations of 2'-carboxy-2-hydroxy-4-methoxybenzophenone. The panels are exposed in the Weather-Ometer for 300 hours and surface cracking and crazing noted:

| Conc. of U.V. Absorber: | Appearance after Weather-Ometer exposure |
|---|---|
| Control | Cracked badly between 100 and 200 hours. |
| 2.0% | Slight cracking at 300 hours. |
| 5.0% | No cracking at 300 hours. |
| 10.0% | No cracking at 300 hours. |

Example 4

2'-carboxy-2-hydroxy - 4 - methoxybenzophenone was evaluated in a clear alkyd modified nitrocellulose lacquer. The films, 2.0 to 3.0 mils thick, were drawn onto microscopic slides and exposed in a Fade-Ometer. The following table lists the hours of Fade-Ometer exposure at which the film cracked, initial yellowing and yellowing at 300 hours.

| Concentration | Yellow Index at— | | Hours before film cracked |
|---|---|---|---|
|  | 0 hours | 300 hours |  |
| 0 | 0.3 | 3.3 | 300-400 |
| 5.0 | 0.4 | 2.0 | 600-700 |
| 10.0 | 0.6 | 2.7 | 600-700 |

The absorber did not add any objectionable initial yellow color to the lacquer film.

In view of the excellent results obtained in the first set of exposures, further tests were conducted to determine whether the absorber is as effective at lower concentrations as it is at 5.0% and 10.0% with the following results:

| Concentration | Yellow Index | | Hours to film crack |
|---|---|---|---|
|  | 0 hours | 500 hours |  |
| 0 | 0.3 | [1] 3.4 | 300-400 |
| 0.25 | 0.3 | 2.4 | 500-600 |
| 0.5 | 0.3 | 2.8 | 600-700 |
| 1.0 | 0.4 | 2.8 | 600-700 |

[1] Since the control film cracked badly between 300 to 400 hours, this is a Yellow Index value at 300 hours.

An alkyl-modified nitrocellulose lacquer containing three concentrations of the same U.V. absorber was evaluated on edge grain pine wood in a Fade-Ometer. In addition to the coated panels, an uncoated pine panel was also exposed. These results are as follows:

| Concentration: | Color change of wood panels after 300 hours |
|---|---|
| 0 | Severe. |
| 0.5 | Moderate. |
| 1.0 | Slight. |
| 2.0 | Slight. |

We claim:

A composition stabilized against degradation by ultraviolet radiation comprising nitrocellulose lacquer admixed with from 0.05% to 10.0% by weight of a compound of the structure:

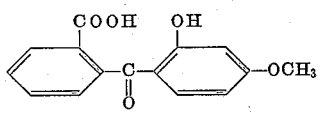

References Cited by the Examiner

UNITED STATES PATENTS 2,974,053  3/61  Suchow _____ 106—187
3,006,887  10/61  Schoepfle et al. _____ 260—45.95

ALEXANDER H. BRODMERKEL, *Primary Examiner.*